United States Patent
Bakran et al.

(10) Patent No.: US 9,705,406 B2
(45) Date of Patent: Jul. 11, 2017

(54) MODULAR MULTI-LEVEL DC-DC CONVERTER FOR HVDC APPLICATIONS

(71) Applicant: SIEMENS AKTIENGESELLSCHAFT, Munich (DE)

(72) Inventors: Mark-Matthias Bakran, Erlangen (DE); Dominik Ergin, Baiersdorf (DE); Hans-Joachim Knaak, Erlangen (DE); Andre Schoen, Bayreuth (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/904,984

(22) PCT Filed: Jul. 15, 2013

(86) PCT No.: PCT/EP2013/064928
§ 371 (c)(1),
(2) Date: Jan. 14, 2016

(87) PCT Pub. No.: WO2015/007302
PCT Pub. Date: Jan. 22, 2015

(65) Prior Publication Data
US 2016/0141963 A1 May 19, 2016

(51) Int. Cl.
*H02M 3/335* (2006.01)
*H02M 7/48* (2007.01)
(Continued)

(52) U.S. Cl.
CPC ....... *H02M 3/33507* (2013.01); *H02M 3/156* (2013.01); *H02M 7/483* (2013.01);
(Continued)

(58) Field of Classification Search
CPC ...... H02M 7/12; H02M 7/217; H02M 7/2173; H02M 7/48; H02M 7/49; H02M 7/219;
(Continued)

(56) References Cited

U.S. PATENT DOCUMENTS 3,448,286 A   6/1969 Stackegard
3,942,089 A * 3/1976 Kanngiesser ....... H02M 7/7575
                                                       307/82

(Continued)

FOREIGN PATENT DOCUMENTS

SE   WO 2013149633 A1 * 10/2013 ............. H02J 1/102
SE   WO 2013185825 A1 * 12/2013 ............. H02M 3/24
(Continued)

OTHER PUBLICATIONS

Bahrman, M., et al., "The ABCs of HVDC Transmission Technologies—An Overview of High Voltage Direct Current Systems and Applications", IEEE power & energy magazine, Mar. 2007, pp. 32-44.
(Continued)

*Primary Examiner* — Fred E Finch, III
*Assistant Examiner* — Yusef Ahmed
(74) *Attorney, Agent, or Firm* — Laurence Greenberg; Werner Stemer; Ralph Locher

(57) ABSTRACT

A DC-DC converter for connecting high-voltage DC networks has series-connected sub-converters. The high-voltage DC networks which can be connected to the DC-DC converter can have different transmission symmetries by way of power exchanging devices and additional power exchanging devices. Thus, a symmetrical monopole can be connected to an asymmetrical bipolar network using the invention.

10 Claims, 8 Drawing Sheets

(51) Int. Cl.
*H02M 3/156* (2006.01)
*H02M 7/483* (2007.01)
*H02M 7/493* (2007.01)
*H02J 3/36* (2006.01)

(52) U.S. Cl.
CPC ............ *H02M 7/493* (2013.01); *H02J 3/36* (2013.01); *H02M 2007/4835* (2013.01); *Y02E 60/60* (2013.01)

(58) Field of Classification Search
CPC ............ H02M 7/7575; H02M 7/5388; H02M 2007/4835; H02M 3/156; H02J 1/102; H02J 3/36
See application file for complete search history.

(56) References Cited

U.S. PATENT DOCUMENTS

| | | | | |
|---|---|---|---|---|
| 4,308,575 | A * | 12/1981 | Mase | H02J 1/02 174/DIG. 17 |
| 4,758,939 | A * | 7/1988 | Matsuo | H02M 7/1626 363/138 |
| 8,345,457 | B2 * | 1/2013 | Asplund | H02J 3/36 363/125 |
| 8,861,234 | B2 * | 10/2014 | Trainer | H02M 3/07 307/110 |
| 9,065,328 | B2 | 6/2015 | Papastergiou et al. | |
| 9,461,538 | B2 * | 10/2016 | Srivastava | H02M 3/22 |
| 2013/0308235 | A1 * | 11/2013 | Davies | H02H 7/1257 361/62 |
| 2014/0078796 | A1 * | 3/2014 | Inoue | H02M 5/10 363/68 |
| 2014/0211528 | A1 * | 7/2014 | Inoue | H02M 7/797 363/123 |
| 2014/0375122 | A1 * | 12/2014 | Papastergiou | H02J 1/102 307/18 |
| 2015/0145252 | A1 * | 5/2015 | Lin | F03D 9/005 290/44 |
| 2015/0236603 | A1 * | 8/2015 | Jimichi | H02M 5/293 363/37 |
| 2015/0256081 | A1 * | 9/2015 | Bakran | H02M 3/33584 363/21.01 |
| 2015/0256093 | A1 * | 9/2015 | Gupta | H02M 5/4585 363/35 |
| 2015/0280594 | A1 * | 10/2015 | Lin | H02M 3/33546 363/21.04 |
| 2015/0311813 | A1 * | 10/2015 | Gaudenz | H02M 5/42 363/35 |
| 2015/0333654 | A1 * | 11/2015 | Song | H02M 7/49 363/89 |
| 2016/0013653 | A1 * | 1/2016 | Dorn | H02M 7/003 363/35 |
| 2016/0056729 | A1 * | 2/2016 | Tenca | H02M 7/217 363/135 |
| 2016/0099652 | A1 * | 4/2016 | Choi | H02J 3/36 363/35 |
| 2016/0285373 | A1 * | 9/2016 | Lin | H02J 1/10 |

FOREIGN PATENT DOCUMENTS

| | | |
|---|---|---|
| WO | 2013071962 A1 | 5/2013 |
| WO | 2013149633 A1 | 10/2013 |
| WO | 2013185825 A1 | 12/2013 |
| WO | 2014056540 A1 | 4/2014 |

OTHER PUBLICATIONS

Knudsen, L., et al., "Description and Prospective Applications of New Multi-Terminal HVDC System Concepts", Cigre Conf. Internationale Des Grands Reseaux Electriques, Aug. 26-Sep. 1, 1990, pp. 1-11, XP000770178.

* cited by examiner

US 9,705,406 B2

MODULAR MULTI-LEVEL DC-DC CONVERTER FOR HVDC APPLICATIONS

BACKGROUND OF THE INVENTION

Field of the Invention

The invention relates to a DC converter for connecting high-voltage DC networks with different voltages.

A DC converter known from the prior art for connecting high-voltage DC networks that are at different voltage levels is illustrated as an example in FIG. 1. For the connection of a first high-voltage DC network the DC converter shown there comprises a first DC connection 1 that comprises a positive DC terminal 2 along with a negative DC terminal 3. For the connection of a second high-voltage DC network with a lower nominal DC voltage, a second DC connection 4 is provided, which again comprises a positive DC terminal 5 as well as a negative DC terminal 6. Three phase modules 7 of a first sub-converter 8 extend between the positive 2 and the negative 3 DC terminals of the first DC connection 1. A phase module 7 here consists of two converter arms 9 connected together in series as well as an inductance 10 in the form of coils. A second sub-converter 11 is furthermore provided, also comprising three phase modules 7 each of which is composed of two converter arms 9 connected in series and an inductance 10. Each phase module 7 comprises two DC connections, one of which constitutes the positive connection terminal 5 and one the negative connection terminal 6 of the second DC connection 4. The potential node between the converter arms 9 constitutes one AC phase of an AC connection 12 of the respective converter 8 or 11. The two AC connections 12 are connected to one another through a three-phase transformer 14. The windings of said transformer 14 can be connected to one another in any desired manner in this case, for example in a delta or star configuration.

In accordance with this known apparatus, the DC voltage of the first DC network is first converted by the first sub-converter 8 into an AC voltage, transformed by the transformer 14 to the respectively required voltage level, and then again converted by the sub-converter 11 to the desired DC voltage.

DC converters for small to medium powers are also sufficiently well-known. Boost or buck converters should be mentioned in this context. They are equipped with coils and capacitors, wherein power semiconductor switches provide a temporary interruption to a flow of current. The power semiconductors of the known boost or buck converters would be, however, so heavily loaded in the high-voltage range, that irreparable damage could occur even after a short time.

An apparatus that is described by way of example in FIG. 2 is made known by the as yet unpublished international patent application PCT/EP2012/070203. The DC converter 15 shown there has a first DC connection 1 with a positive 2 and a negative 3 DC terminal. A second DC connection 4 with a positive DC terminal 5 and a negative DC terminal 6 is furthermore provided. The DC terminal 6 is at the same potential as the DC terminal 3 of the first DC connection 1. The DC converter 15 shown furthermore comprises a first sub-converter 8 and a second sub-converter 11 that are connected in series with one another and form a converter series circuit 16, wherein the first sub-converter 8 is connected on the DC side through inductances 10 to the positive DC terminal 2 of the first DC connection 1 and with the positive DC terminal 5 of the second DC connection 4. The second sub-converter 11 is also connected on the DC side through inductances 10 to the positive DC terminal 5 of the second DC connection 4 and to the negative DC terminal 3 of the first DC connection 1. The converter series circuit 16 extends between the DC terminals 2, 3 of the first DC connection 1. The second sub-converter 11 with its phase modules 7 extends between the DC terminals 5, 6 of the second DC connection 4.

The first DC connection 1 serves to connect a first DC network with the nominal DC voltage $U_{DC1}$. The second DC connection serves to connect a second DC network with the nominal voltage $U_{DC2}$. The nominal DC voltage $U_{DC1}$ of the first DC network is here three times greater than the nominal DC voltage of the second DC network $U_{DC2}$ ($U_{DC1}=3*U_{DC2}$). The transmission ratio ü of the DC converter 15 is thus equal to 3. During operation of the DC converter 15, the voltage $U_{DC2}$ of the second DC network is thus dropped across the second sub-converter 11. The positive DC terminal 5 of the second DC connection 4 is at the DC potential node between the first sub-converter 8 and the second sub-converter 11.

The topology of the first sub-converter 8 can correspond largely to the topology of the second sub-converter 11. In order, however, to be able to block short-circuits in the first DC network and, at the same time, to be able to operate with the lowest possible losses, the structure of the sub-converters can be different.

The AC connection 12 of the first sub-converter 8 is conductively connected to a primary winding 18 of a three-phase transformer 14 as a power exchanging means. The AC connection 12 of the second sub-converter 11 is connected to the secondary winding of the transformer. An exchange of power is enabled between the first sub-converter 8 and the second sub-converter 11 through the inductive coupling of the windings of the transformer. The sub-converters 8, 11 are here driven in such a way that a flow of power takes place from the first sub-converter 8 to the second sub-converter 11, which then introduces the power into the DC network connected to the second DC connection 4.

A DC converter of this sort illustrated in FIG. 2 has the advantage over the DC converter shown in FIG. 1 of being significantly more economical. The DC converter shown in FIG. 2 is not, however, suitable for connecting high-voltage DC networks together if they have different symmetries from one another or if potential isolation is desired. Such different symmetries do, however, meet when, for example, a so-called symmetrical high-voltage DC network is to be connected to a non-symmetrical bipolar high-voltage DC network-transmission network.

BRIEF SUMMARY OF THE INVENTION

It is therefore the object of the invention to provide a DC converter that is economical and that at the same time permits the connection of high-voltage DC networks that can have different symmetries from one another.

The invention achieves this object through a DC converter with
- a converter series circuit formed of sub-converters connected in series that is arranged between a positive and a negative connection terminal of a first DC connection,
- wherein at least two sub-converters of the converter series circuit are arranged as positive pole sub-converters in series between a central connection terminal and the positive connection terminal of the first DC connection and the positive pole sub-converters are connected together through positive pole power exchanging means, so that the exchange of electrical power between the positive pole sub-converters is enabled, wherein the potential node between the positive pole sub-converters forms a positive connection terminal of a second DC connection, wherein at least two sub-converters of the converter series circuit are arranged as negative pole sub-converters in series between the central connection terminal and the negative connection terminal of the first DC connection and the negative pole sub-converters are connected together through negative pole power exchanging means, so that the exchange of electrical power between the negative pole sub-converters is enabled, wherein the potential node between the negative pole sub-converters forms a negative connection terminal of the second DC connection, and wherein additional power exchanging means are provided that are connected to the positive pole sub-converters and the negative pole sub-converters in such a way that an exchange of power between the positive pole sub-converters and the negative pole sub-converters through the additional power exchanging means is enabled.

According to the invention, a DC converter is provided with which two high-voltage DC networks that exhibit both different nominal DC voltages and different symmetries can be connected together. The DC converter according to the invention is thus provided with two DC connections, each of which comprises two connection terminals. A converter series circuit comprising sub-converters connected together in series extends between the connection terminals of the first DC connection, which is designed for the larger DC voltage. The sub-converters can be divided into positive pole sub-converters and negative pole sub-converters, wherein the positive pole sub-converters are in turn connected in series with the negative pole sub-converters. The potential node between the positive pole sub-converters and the negative pole sub-converters forms a central connection terminal, wherein the positive pole sub-converters extend between the positive connection terminal of the first DC connection and the central connection terminal. In other words, the positive pole sub-converters are connected in series between the central connection terminal and the positive connection terminal of the first DC connection. The positive pole sub-converters are here connected to one another through positive pole power exchanging means, so that these can exchange power between themselves. A potential node between positive pole sub-converters connected together on the DC side forms a positive connection terminal of the second DC connection. Negative pole sub-converters are accordingly provided, which are also connected in series, wherein this series circuit is arranged between the central connection terminal and the negative connection terminal of the first DC connection. Negative pole power exchanging means permit the exchange of power between the negative pole sub-converters that are connected to one another in series. A potential node between negative pole sub-converters that are connected directly to one another forms a negative connection terminal of the second DC connection, across which for example a smaller voltage is dropped in comparison with the first DC connection. Additional power exchanging means are also provided within the framework of the invention, with the aid of which an exchange of power is permitted between the positive pole sub-converters and the negative pole sub-converters. In this way an arbitrary flow of power between the sub-converters can be induced, so that even DC networks with different nominal voltage and symmetry can be connected together. Expediently each sub-converter comprises at least two phase modules connected in parallel, each of which has a three-pole implementation, and each of which has two DC connection terminals and one AC connection terminal, so that the AC connection terminals provide an AC connection of the respective sub-converter. The DC terminals of the parallel phase modules of a sub-converter are connected together, so that a bridge circuit is created. According to this advantageous implementation, both the phase modules of the positive pole sub-converters and the phase modules of the negative pole sub-converters each have a three-pole implementation. The phase modules of a sub-converter are expediently identical.

According to an expedient development of this aspect, all the sub-converters have essentially the same implementation. They have, in other words, the same topology.

According to an expedient development of this aspect, the positive pole power exchanging means and the negative pole power exchanging means each have a transformer that connects together two respective AC connections of different sub-converters. According to this advantageous development, a positive pole transformer couples the AC connections of the positive pole sub-converters together inductively, so that the exchange of power between the two positive pole sub-converters takes place on the AC side through the positive pole transformer. A negative pole transformer is accordingly provided, that couples the AC connections of the negative pole sub-converters together inductively. In this way, the power exchanged between the positive or negative pole sub-converters flows through the positive pole transformer or the negative pole transformer respectively.

The structure or the topology of the sub-converters is essentially arbitrary in the context of the invention. Advantageously, however, each phase module comprises a series circuit of two-pole sub-modules. The sub-modules comprise for example a simple power semiconductor switch in the form of an IGBT, IGCT, GTO or the like, with which a freewheeling diode is connected in parallel with the opposite polarity. Differing from this, each sub-module is a reverse-conducting power semiconductor switch. Expressed otherwise, each sub-module consists exclusively of a reverse-conducting power semiconductor switch. The number of sub-modules connected in series here is adapted to the respective voltages to be increased that are dropped across the first and second DC connections.

Advantageously however, each sub-module is fitted with an energy store and a power semiconductor circuit, wherein a half-bridge or full-bridge circuit is formed. All or some sub-modules of one phase-module can, moreover, be constructed as a double module. The power semiconductor circuit comprises a plurality of power semiconductor switches connected together. If necessary, the power semiconductor circuit also comprises freewheeling and/or clamping diodes. A sub-converter of this sort is also referred to as a modular multi-stage converter, wherein the power semiconductor circuit, as part of a half-bridge circuit, is a series circuit of two power semiconductor switches, with each of which a freewheeling diode of the opposite polarity is respectively connected in parallel. Alternatively, instead of a power semiconductor switch with a freewheeling diode of opposite polarity, a reverse-conducting power semiconductor switch can also be employed within the framework of the invention. In the case of a half-bridge circuit, one connection terminal of the two-pole sub-module is connected to the potential node between the power semiconductor switches of the series circuit, while the other connection terminal of the sub-module is connected, with low inductance, to one pole of the energy store.

In a full-bridge circuit, two series circuits, each comprising two power semiconductor switches, each having a freewheeling diode of opposite polarity, are connected in parallel with the energy store. One of the connection terminals is connected to the potential node between the power semiconductor switches of the first series circuit, and the second connection terminal of the sub-module with the potential node between the power semiconductor switches of the second series circuit. Instead of one power semiconductor switch, it is also of course possible to employ a plurality of power semiconductor switches connected in series and driven simultaneously. The synchronously driven power semiconductor switches then behave like a single power semiconductor switch.

Each sub-converter expediently comprises two phase modules. According to this advantageous development, the sub-converters have a particularly economical design.

According to a further variant of the invention, the additional power exchanging means couple the positive pole power exchanging means and the negative pole power exchanging means together inductively. It is expedient here if the positive pole power exchanging means comprise a positive pole transformer and the negative pole power exchanging means comprise a negative pole transformer. The additional power exchanging means comprise, for example, a tertiary winding that is arranged in the positive pole transformer, and a further tertiary winding that is arranged in the negative pole transformer. In this way a particularly simple and thereby economical coupling of power is provided within the framework of the invention. Transformers with three windings that are wound together on a common transformer core are well known from the prior art, and there is therefore no need to consider their precise design here in more detail.

Differing from this, however, it is also possible for the additional power exchanging means to couple the AC connection of one of the positive pole sub-converters to the AC connection of one of the negative pole sub-converters inductively. According to this advantageous design, the additional power exchanging means comprise, for example, an additional transformer, wherein one of the windings of the additional transformer is connected to the AC network connection of one of the positive pole sub-converters, and the second winding of the additional transformer is connected to an AC connection of the negative pole sub-converter.

It can, moreover, be expedient within the framework of the invention for the additional power exchanging means to be fitted with a network connection for the connection of an AC power supply network. This network connection is, for example, a tertiary winding that is part of an additional transformer. If, on the other hand, the additional power exchanging means comprise a tertiary winding of a positive pole transformer and a tertiary winding of a negative pole transformer, the network connection is implemented as a connection line that is connected conductively to a connecting cable to which the tertiary windings of the additional power exchanging means are connected.

BRIEF DESCRIPTION OF THE SEVERAL VIEWS OF THE DRAWING

Further expedient embodiments and advantages of the invention are the object of the following description of exemplary embodiments of the invention with reference to the figures of the drawing, wherein the same reference signs refer to components having the same effect, and wherein.

DESCRIPTION OF THE INVENTION

Figure 1:
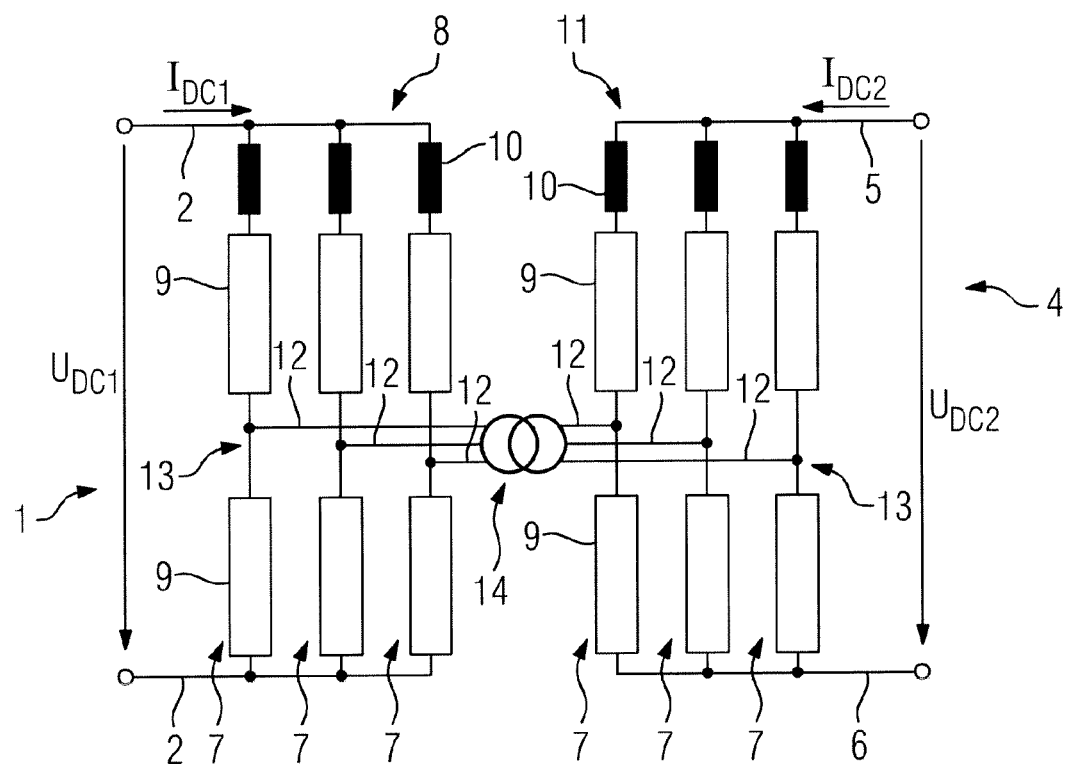
FIG. 1 shows a DC converter according to the prior art.
Figure 2:
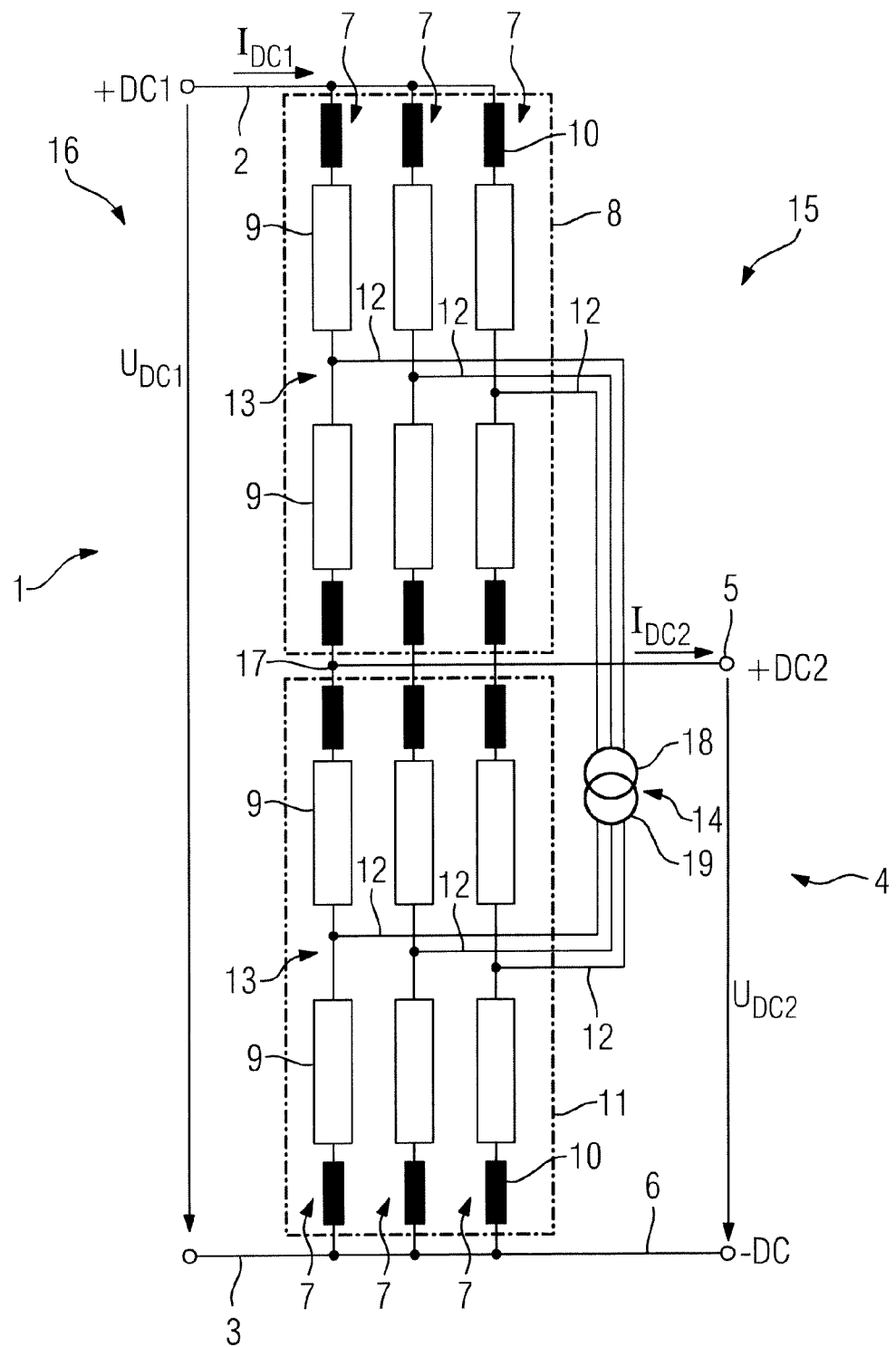
FIG. 2 shows a DC converter for which a patent application has been made but not published.

FIGS. 1 and 2 have already been described extensively in connection with the introductory description.

Figure 3:
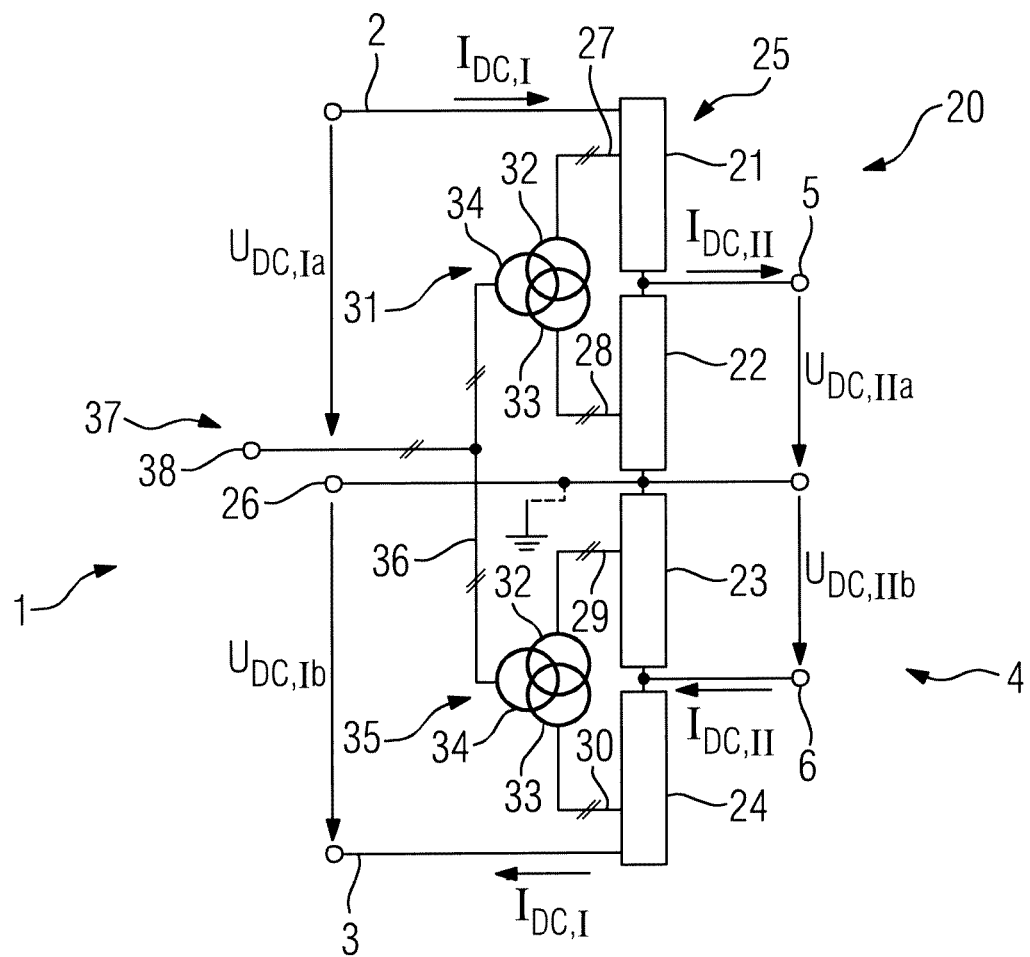
FIG. 3 shows a first exemplary embodiment of the DC converter according to the invention.

FIG. 3 shows an exemplary embodiment of the DC converter 20 according to the invention which consists of a series circuit of four sub-converters 21, 22, 23 and 24, so that a converter series circuit 25 is provided which is connected between a positive connection terminal 2 and a negative connection terminal 3 of a first DC connection 1. A central connection terminal 26, which is connected to the ground potential, can furthermore be recognized. The sub-converters 21 and 22 are arranged between the positive connection terminal 2 of the first DC connection 1 and the central connection terminal 26, and are referred to below as the positive pole sub-converters 21 and 22. The potential node between the positive pole sub-converters 21 and 22 forms a positive connection terminal 5 of a second DC connection 4. The sub-converters 23 and 24 are arranged between the central connection terminal 26 and the negative connection terminal 3 of the first DC connection 1, and are referred to below as negative pole sub-converters 23 and 24. In other words, the positive pole sub-converters 21 and 22 are connected between the positive connection terminal 2 of the first DC connection 1, and the central connection terminal 26, while the negative pole sub-converters 23 and 24 are arranged between the central connection terminal 26 and the negative connection terminal 3 of the first DC connection 1. The potential node between the negative pole sub-converters 23 and 24 forms the negative connection terminal of the second DC connection 4.

Each of said sub-converters 21, 22, 23 and 24 comprises two phase modules connected in parallel with one another, each of which has a three-pole implementation and has an AC connection terminal in addition to two DC connection terminals. The AC connection terminals of the phase modules of a sub-converter 21, 22, 23 or 24 together form an AC connection 27, 28, 29 or 30 of the respective sub-converter 21, 22, 23 or 24. Each DC connection terminal of a phase module is connected to a DC terminal of the parallel phase module.

The AC connection 27 of the first positive pole sub-converter 21 is coupled inductively to the AC connection 29 of the second positive pole sub-converter 22. For this purpose a positive pole transformer 31 serves as the positive pole power exchanging means, and comprises a primary winding 32 and a secondary winding 22. The primary winding 32 is connected conductively to the AC connection 27 of the first positive pole sub-converter 21, and the secondary winding 33 is connected conductively to the AC connection 29 of the second positive pole sub-converter 22. The positive pole transformer 31 furthermore comprises a tertiary winding 34 which will be considered in more detail further down.

A negative pole transformer 35 can be recognized as a negative pole power exchanging means on the negative pole side of the DC converter 20, which in the same way inductively couples the AC connection 29 of the first negative pole sub-converter 23 inductively to the AC connection 30 of the second negative pole sub-converter 24.

With the aid of the positive pole power exchanging means 31, or of the negative pole power exchanging means 35, an exchange of power between the positive pole and negative pole sub-converters respectively is enabled. The flow of power can be controlled through the drive to the power semiconductor switches of the respective sub-converters 21, 22, 23 and 24. A suitable controller is used for this, depending on the respective topology of the sub-converters 21, 22, 23 and 24. The AC voltages and currents at the AC connections of the sub-converters can be adjusted with the aid of the controller. Control or regulation units of this sort are, however, known to the expert, so that there is no need to consider them here in any more detail.

Like the positive pole transformer 31, the negative pole transformer 35 also has, in addition to the windings 32 and 33 that are coupled together inductively, a tertiary winding 34 which is connected conductively by means of a connecting cable 36 to the tertiary winding 34 of the positive pole transformer 31. Here the tertiary windings 34 of the positive pole transformer 31 and the negative pole transformer 35, together with their two-phase connecting cable 36, constitute what is known as additional power exchanging means 37, by means of which an exchange of power between the positive pole power exchanging means 31 and the negative pole power exchanging means 35 is enabled. It is possible on the basis of this additional power coupling to employ the DC converter 20 for the connection of high-voltage DC networks that not only have different nominal voltages, but also have a different transmission topology. This property will be considered in more detail further below.

As has already been described, the tertiary windings 34 and their connecting cable 36 form additional power exchanging means 37. In the exemplary embodiment shown in FIG. 3, the additional power exchanging means 37 have a network connection 38 that can be employed as a connection for a power supply network. The network connection 38 here is a two-phase connection line which is connected to the respective phase of the connecting cable 36.

Figure 4:
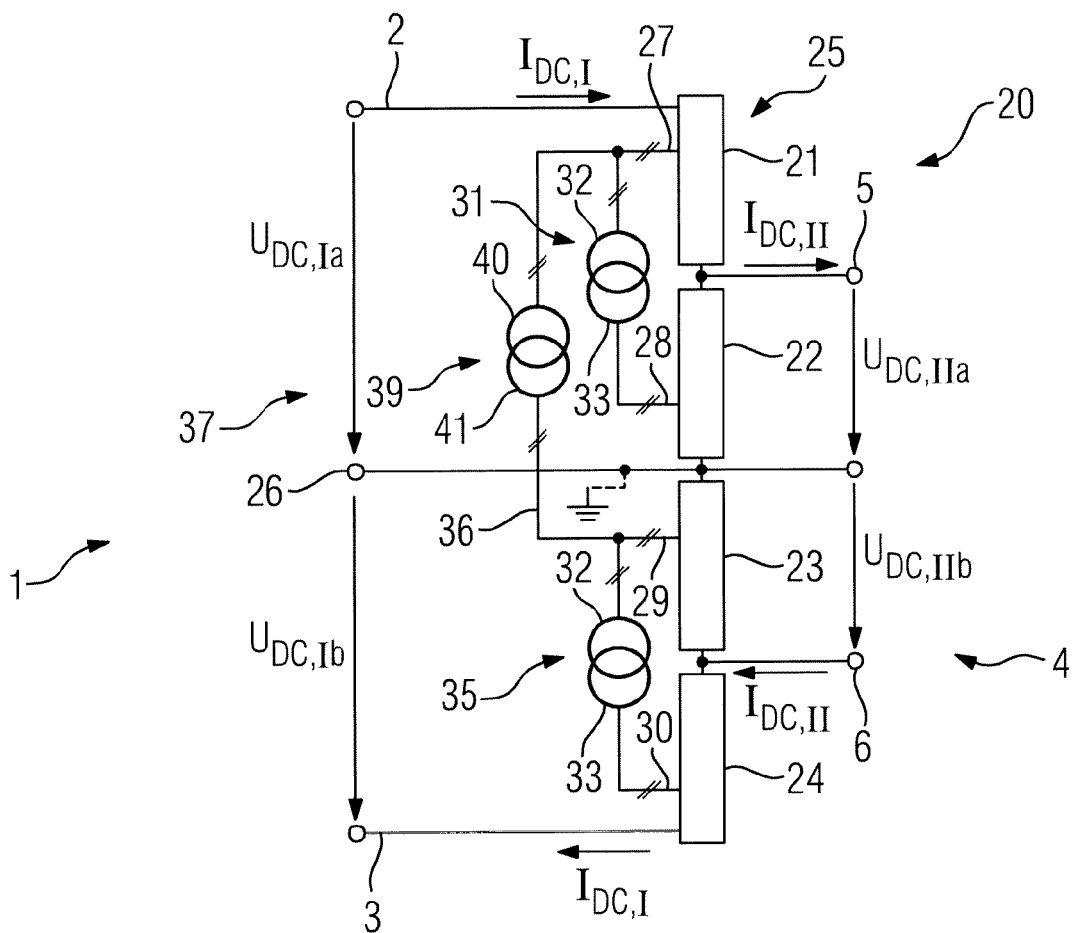
FIG. 4 shows a further exemplary embodiment of the DC converter according to the invention.

FIG. 4 shows a further exemplary embodiment of the DC converter according to the invention, which only differs from the exemplary embodiment shown in FIG. 3 in the configuration of the additional power exchanging means 37. Instead of tertiary windings, the DC converter 20 shown in FIG. 4 thus has an additional transformer 39 which has a primary winding 40 and a secondary winding 41 that are coupled together inductively. The primary winding 40 here is connected to the AC connection 27 of the first positive pole sub-converter 21. The secondary winding 41 of the additional transformer 39 is, on the other hand, connected to the AC connection 29 of the first negative pole sub-converter 23. The exchange of power between one of the positive pole sub-converters 21 and one of the negative pole sub-converters 23 is enabled through the additional transformer 39.

Since the positive pole sub-converters 21 and 22, as well as the negative pole sub-converters 23 and 24 are connected together via the positive pole power exchanging means or the negative pole power exchanging means respectively, any desired flow of power between the sub-converters 21, 22, 23 and 24 is also enabled in the exemplary embodiment shown in FIG. 4, and thus also the connection of different high-voltage DC networks.

Figure 5:
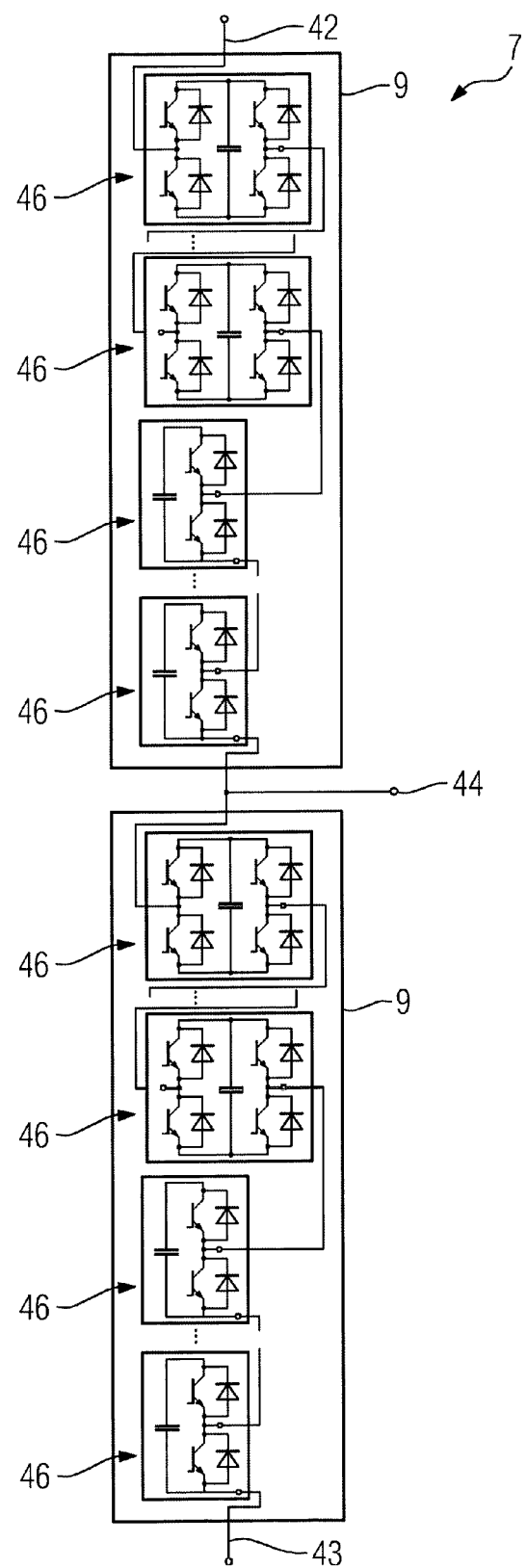
FIG. 5 shows a phase module of a sub-converter of a DC converter according to one of FIG. 3 or 4, FIGS. 6, 7 and 8 show exemplary embodiments of sub-modules of a phase module according to FIG. 5.

FIG. 5 shows an exemplary embodiment of a phase module of one of the sub-converters 22, 23, 24 or 25. It can be seen that each phase module 7 comprises a first DC connection terminal 42 and a second DC connection terminal 43. In addition, an AC connection terminal 44 can be recognized, wherein a converter arm 9 extends in each case between each DC connection terminal 42 or 43 respectively and the AC connection terminal 44. In other words, each phase module 7 has two converter arms 9 connected together in series, wherein the potential node between the converter arms 9 forms the AC connection terminal 44. It should be noted at this point that each phase module 7 can, moreover, also comprise inductances for limiting a circuit current that flows through the phase modules 7.

Figure 6:
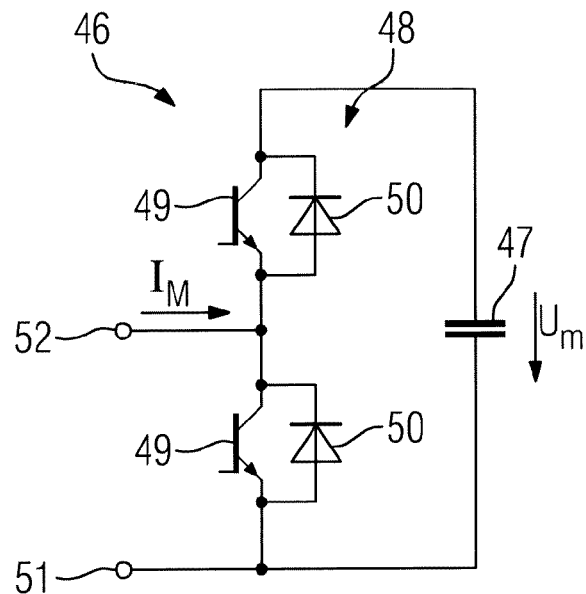
Figure 7:
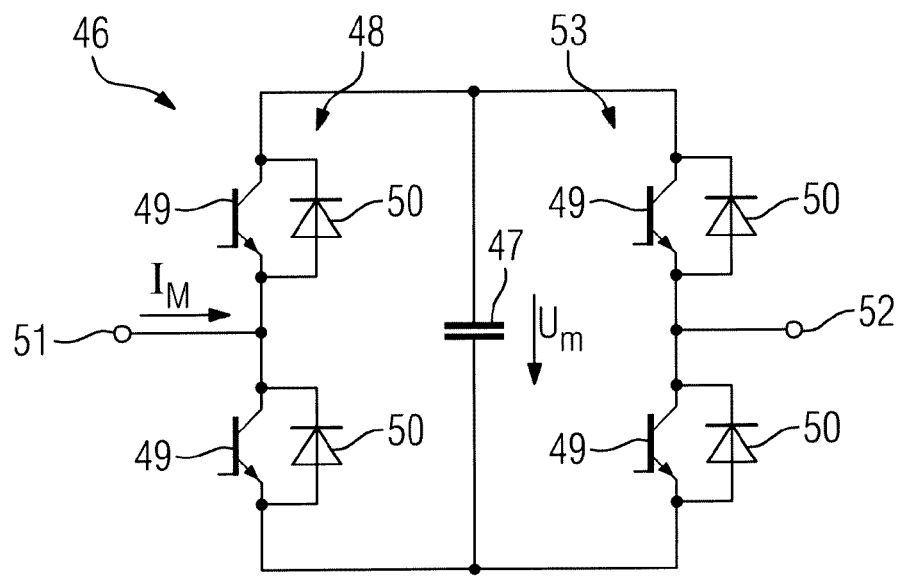
Figure 8:
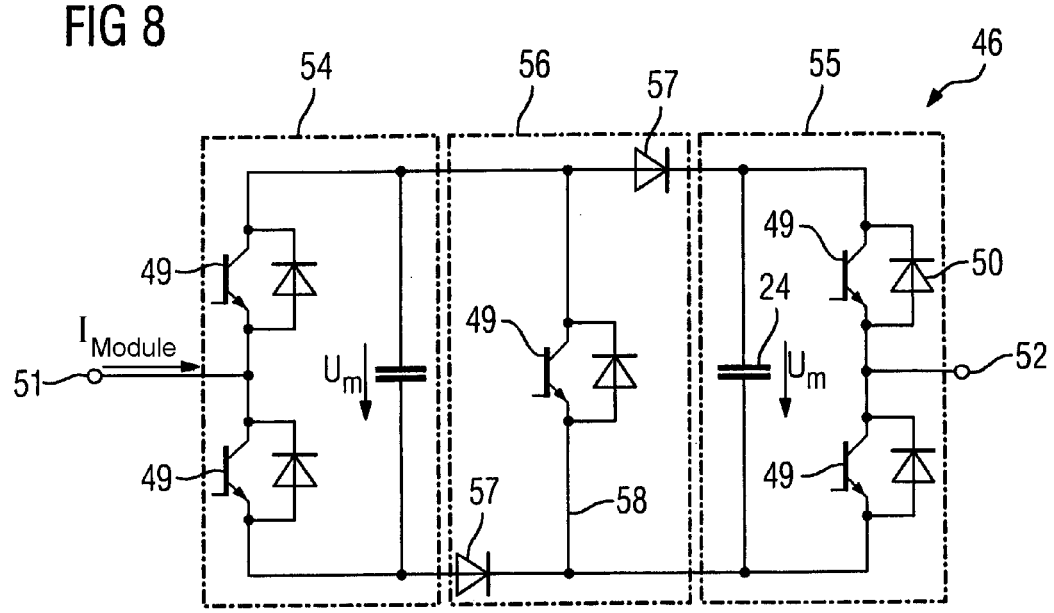

It can also be seen from FIG. 5 that the converter arms 9, and thus the phase modules 7, each comprise a series circuit of two-pole sub-modules 46, which, in the exemplary embodiment illustrated in FIG. 5, have different designs from one another. Examples of such sub-modules 46 are illustrated in FIGS. 6, 7 and 8. In the context of the invention, the phase modules 7 can consist of identical sub-modules, or however of different sub-modules, as suggested in FIG. 5.

The sub-module 46 illustrated in FIG. 6 is what is known as a half-bridge circuit. It can be seen that this sub-module 46 comprises an energy store 47 in the form of a unipolar capacitor 47. A series circuit 48 of two power semiconductor switches 49, IGBTs in this case, is connected in parallel with the capacitor 47, wherein each IGBT 49 in turn has a freewheeling diode 50 of opposite polarity connected in parallel with it. A first sub-module connection terminal 51 of the sub-module 46 is connected to one pole of the capacitor 47, whereas a second sub-module connection terminal 52 is connected to the potential node between the IGBTs 49. According to how the power semiconductor switch 49 is driven, it is thus possible to generate the voltage $U_m$ dropped across the capacitor 47, or a zero voltage.

FIG. 7 shows a further exemplary embodiment of a sub-module 46, which again comprises an energy store 47 in the form of a capacitor, across which a unipolar voltage $U_m$ is dropped. Here again a first series circuit 48 of two IGBTs 49 is provided, wherein each IGBT 49 again has a freewheeling diode 50 of the opposite polarity connected in parallel with it. A second series circuit 53 is, however, also provided, and is also connected in parallel with the capacitor 47. The second series circuit 53 also comprises two IGBTs 49 connected in series, with each of which a freewheeling diode 50 of the opposite polarity is connected in parallel. The first sub-module connection terminal 51 is connected to the potential node between the IGBTs 49 of the first series circuit 46, wherein the potential node between the IGBTs 47 of the second series circuit 50 constitutes the second connection terminal 52. With a full-bridge circuit, it is possible for the voltage $U_m$ dropped across the energy store 47, a zero voltage, or the inverse capacitor voltage $-U_m$ to be generated once at the two connection terminals 51 and 52.

The flow of current between the connection terminals 51 and 52 can moreover be selectively controlled in both directions with the full-bridge circuit 46 according to FIG.

11. Expressed otherwise, in the event of a short-circuit, an opposing potential can be developed in both directions with the aid of a full-bridge module 46, and can be used to suppress the short-circuit current. With a sub-module 46 according to FIG. 6, which is thus implemented as a half-bridge circuit, it is possible with the appropriate polarity for current to flow from the sub-module connection terminal 51 through the lower freewheeling diode 50 into the sub-module connection terminal 52, without this being able to be actively interrupted. A short-circuit current in this direction can therefore not be influenced. On the other hand, the half-bridge circuit nevertheless offers the advantage that it only requires two IGBTs and two freewheeling diodes for its construction, and is thus significantly more economical to manufacture than the full-bridge circuit according to FIG. 7. The losses of the half-bridge circuit are, moreover, lower.

The sub-module 46 illustrated in FIG. 8 represents a compromise between the two implementations, i.e. between the half-bridge and the full-bridge circuits, and this is also known as a double-module circuit. The double-module circuit 46 is described in detail in WO 2011/067120, and consists of two identical sub-units 54 and 55, whose topology is based on that of a half-bridge circuit. The sub-units 54 and 55 each comprise an energy store 47 in the form of a capacitor, as well as a series circuit 48 of two IGBTs 49, each with an anti-parallel freewheeling diode 50. Reverse-conducting power semiconductors may, alternatively, be considered. A first sub-module connection terminal 51 is connected to the potential node between the IGBTs 49 of the first sub-unit 54, whereas the second sub-module connection terminal 52 is connected to the potential node between the IGBTs 49 of the second sub-unit 55. The two sub-units 54 and 55 are connected together by connecting means 56, wherein the connecting means 56 comprise potential isolation diodes 57 as well as another IGBT 49 in a central branch 58, which connects the cathode of the lower potential isolation diode 57 with the anode of the upper potential isolation diode 57. This sub-module 46 can generate the same voltages at its sub-module connection terminals 51, 52 as two half-bridge circuits 46 according to FIG. 6 connected in series, wherein, however, the connecting means 56 ensure that an opposing potential can be developed to short-circuit currents in both directions. Short-circuit currents, which may want to flow in both directions through the connection terminals 51 and 52, can thus be selectively reduced or even suppressed.

Again in respect of FIG. 5, depending on the drive of the sub-module 46, the voltage dropped between the respective DC connection 42, 43 and the respective AC connection 44 can thus be varied in steps. An AC voltage at the AC connection 44 of one of each sub-converter 21, 22, 23, 24 can thus be adjusted.

Figure 9:
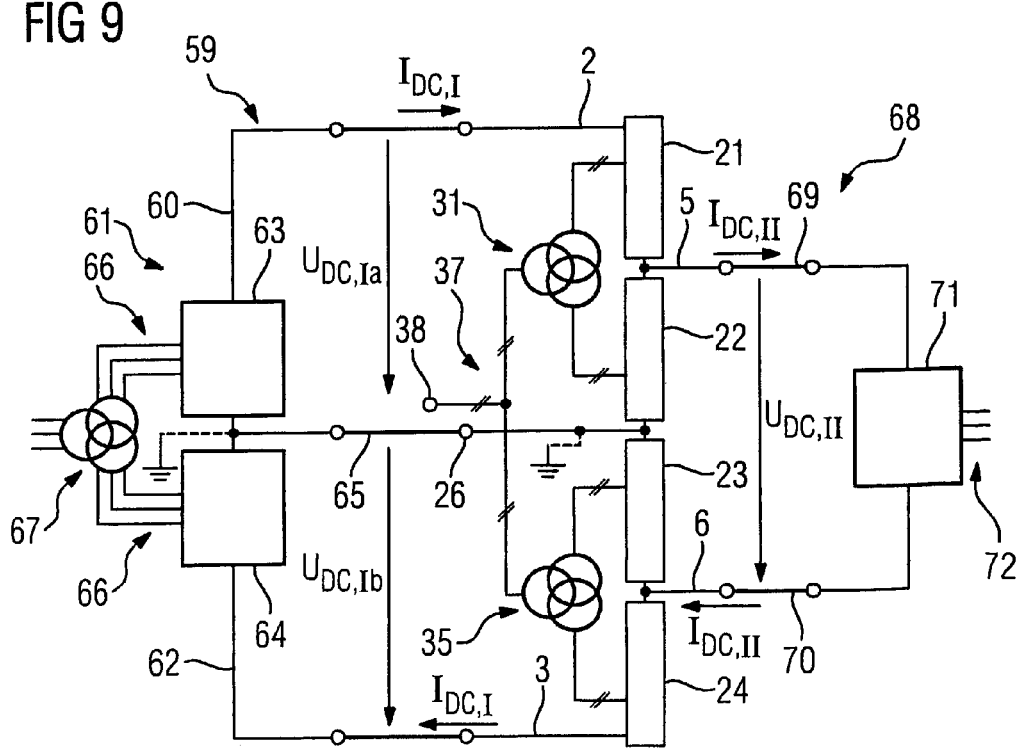
FIG. 9 shows the DC converter according to FIG. 3 for connecting a possibly non-symmetrical two-pole high-voltage DC network to a symmetrical high-voltage DC network.

FIG. 9 shows the DC converter according to FIG. 3, wherein the first DC connection 1 is connected to a two-pole high-voltage DC network 59. The high-voltage DC network 59 has a positive pole line 60 that is connected to a terminal of the DC connection of a 12-pulse converter 61. The second terminal of the DC connection of the 12-pulse converter 61 is connected to a negative pole line 62, which in turn is connected to the negative connection terminal 3 of the first DC connection 1 of the DC converter 20.

The 12-pulse converter 61 has, in a manner known per se, two six-pulse converters 63 and 64 connected with one another in series, wherein the connecting node between the six-pulse converters 63 and 64 is connected to the ground potential. This ground connection is connected via a ground connecting line 64 to the central connection terminal 20 of the DC converter 20. Each of the six-pulse converters 63 and 64 furthermore has an AC connection 65 which is connected to a winding of a three-winding transformer 66. The transformer 66 is connected through its primary winding to an AC network, not illustrated in any more detail. Through the different interconnection (delta, star) of the remaining windings of the transformer, a phase shift is created, so that the desired 12-pulse circuit is enabled. The two-pole high-voltage DC network has the advantage that the transmission of power can be continued even when one pole fails, i.e. for example if the converter 65 fails, wherein the ground connecting line 65 takes the place of the pole line 62. The pole lines 60 and 62 can therefore be differently loaded, wherein compensation currents flow through the ground connecting line 65.

The second DC connection 4 of the DC converter 20 is, on the other hand, connected to what is known as a symmetrical high-voltage DC network, i.e. to a second high-voltage DC network 68 that comprises a positive DC pole line 69 and a negative DC pole line 70. The two DC pole lines 68 and 69 are each connected to the DC connection of a single-pole converter 71, consisting for example of three phase modules 7 according to FIG. 5, which are connected in the form of a Graetz bridge. The converter 71 thus has an AC connection 72 to which, for example, an AC network of a wind farm is connected. The DC pole lines 69 and 70 are here always equally loaded. The power is transmitted symmetrically. With the aid of the DC converter 20, a flow of power between the converters 61 and 71 can be maintained even when one pole fails.

Figure 10:
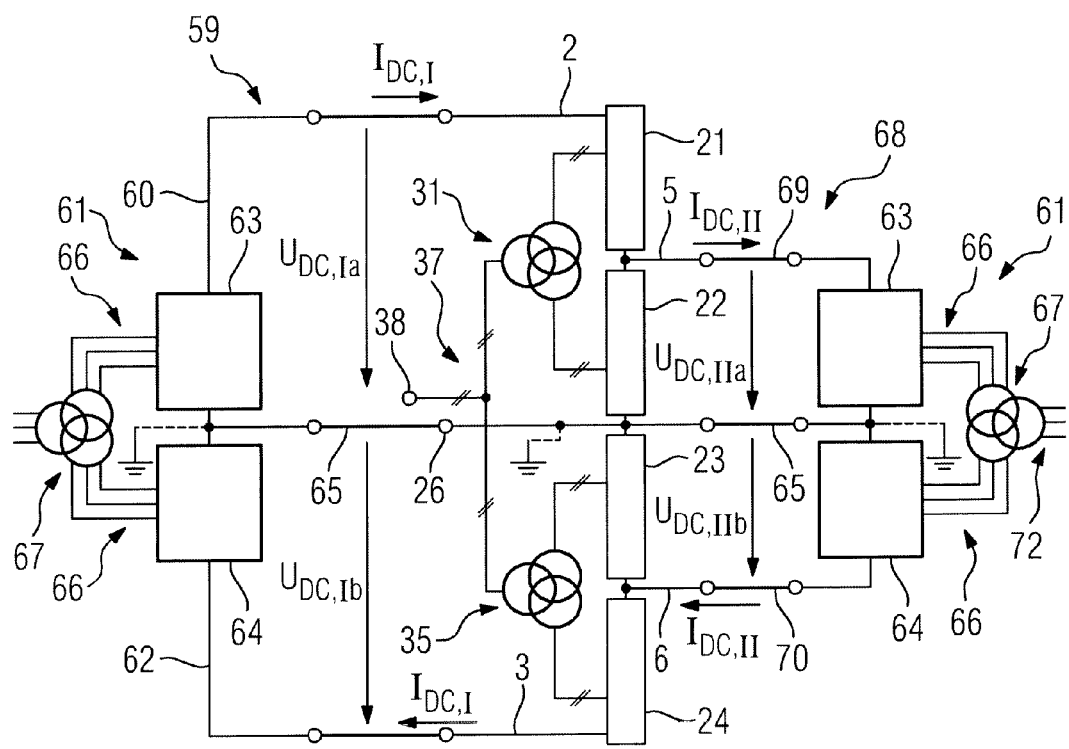
FIG. 10 shows the DC converter according to FIG. 3 for connecting two two-pole high-voltage DC networks.

FIG. 10 shows the use of the DC converter 20 for connecting two two-pole converters 61. Both ground connecting lines 65 are here connected to the grounded central connection terminal 26 of the DC converter.

The invention claimed is:

1. A DC converter for connecting high-voltage DC networks with different voltages, the converter comprising:
   a converter series circuit formed of sub-converters connected in series that is arranged between a positive connection terminal and a negative connection terminal of a first DC connection;
   said converter series circuit having at least two sub-converters arranged as positive pole sub-converters in series between a central connection terminal and said positive connection terminal of said first DC connection;
   a positive pole power exchanging device connecting said positive pole sub-converters to one another for enabling an exchange of electrical power between said positive pole sub-converters;
   a potential node between said positive pole sub-converters forming a positive connection terminal of a second DC connection;
   said converter series circuit having at least two sub-converters arranged as negative pole sub-converters in series between the central connection terminal and said negative connection terminal of said first DC connection;
   a negative pole power exchanging device connecting said negative pole sub-converters to one another for enabling an exchange of electrical power between said negative pole sub-converters;
   a potential node between said negative pole sub-converters forming a negative connection terminal of the second DC connection; and
   an additional power exchanging device connected to said positive pole sub-converters and said negative pole sub-converters for enabling an exchange of power between said positive pole sub-converters and said negative pole sub-converters through said additional power exchanging device;

said positive pole power exchanging device including a positive pole transformer, said negative pole power exchanging device including a negative pole transformer, and said additional power exchanging device having a tertiary winding in said negative pole transformer and a tertiary winding in said positive pole transformer; and said tertiary winding in said negative pole transformer and said tertiary winding in said positive pole transformer being conductively connected to one another.

2. The DC converter according to claim 1, wherein each said sub-converter comprises at least two phase modules, each being a three-pole module, and each having two DC connection terminals and one AC connection terminal, and wherein said AC connection terminals provide an AC connection of the respective said sub-converter.

3. The DC converter according to claim 2, wherein each of said positive pole power exchanging device and said negative pole power exchanging device has a transformer connecting together the respective said AC connections of different sub-converters.

4. The DC converter according to claim 2, wherein each phase module comprises a series circuit of two-pole sub-modules.

5. The DC converter according to claim 4, wherein each said sub-module comprises an energy storage device and a power semiconductor circuit, forming a half-bridge circuit or a full-bridge circuit.

6. The DC converter according to claim 4, wherein each said sub-module comprises an energy storage device and a power semiconductor circuit, forming a double module.

7. The DC converter according to claim 2, wherein each said sub-converter comprises two phase modules.

8. The DC converter according to claim 1, wherein said additional power exchanging device is configured to inductively couple said positive pole power exchanging device and said negative pole power exchanging device together.

9. The DC converter according to claim 1, wherein said additional power exchanging device is configured to inductively couple the AC connection of one of said positive pole sub-converters to the AC connection of one of said negative pole sub-converters together.

10. The DC converter according to claim 1, wherein said additional power exchanging device is fitted with a network connection for connecting an AC power supply network.

* * * * *